United States Patent
Otani et al.

(10) Patent No.: US 11,822,966 B2
(45) Date of Patent: Nov. 21, 2023

(54) ACCELERATOR CONTROL SYSTEM AND ACCELERATOR CONTROL METHOD

(71) Applicant: Nippon Telegraph and Telephone Corporation, Tokyo (JP)

(72) Inventors: Ikuo Otani, Musashino (JP); Noritaka Horikome, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 150 days.

(21) Appl. No.: 17/632,662

(22) PCT Filed: Aug. 22, 2019

(86) PCT No.: PCT/JP2019/032770
§ 371 (c)(1),
(2) Date: Feb. 3, 2022

(87) PCT Pub. No.: WO2021/033306
PCT Pub. Date: Feb. 25, 2021

(65) Prior Publication Data
US 2022/0283868 A1  Sep. 8, 2022

(51) Int. Cl.
*G06F 9/50* (2006.01)
*G06F 9/445* (2018.01)

(52) U.S. Cl.
CPC ........ *G06F 9/5027* (2013.01); *G06F 9/44594* (2013.01)

(58) Field of Classification Search
CPC ............................ G06F 9/44594; G06F 9/5027
See application file for complete search history.

(56) References Cited

U.S. PATENT DOCUMENTS 6,157,719 A * 12/2000 Wasilewski ........... H04L 63/045
725/31
7,460,473 B1 * 12/2008 Kodama ................. H04L 47/34
370/392

(Continued)

FOREIGN PATENT DOCUMENTS

| JP | 2001306343 | 11/2001 |
|---|---|---|
| JP | 2005251017 | 9/2005 |
| JP | 2011015093 | 1/2011 |

OTHER PUBLICATIONS

Tanisho, "Efforts to develop SmartNIC firmware using P4 / C," Okinawa Open Days 2017, Dec. 4, 2017, retrieved from URL <https://www.okinawaopenlabs.com/ood/2017/wp-content/uploads/sites/4/2017/12/fujitsu_3.pdf>, 49 pages (with English Translation).

*Primary Examiner* — Zachary K Huson
(74) *Attorney, Agent, or Firm* — Fish & Richardson P.C.

(57) ABSTRACT

In an accelerator control system (100), a general-purpose server (110) includes a digest information generation unit (1112) that binarizes an accelerator function to generate first digest information (130) of the accelerator function and a server management control unit (1111) that compares the first digest information (130) created before the accelerator function is implemented on an FPGA function unit (122) with second digest information (130) notified from an accelerator board (120) and determines whether the accelerator function is rewritten, and the accelerator board (120) includes a digest information generation unit (1212) that generates the second digest information (130) of the accelerator function written in the FPGA function unit (122), and an FPGA management control unit (1211) that notifies the general-purpose server (110) serving as a rewriting source of the second digest information (130) generated.

8 Claims, 13 Drawing Sheets

(56) References Cited

U.S. PATENT DOCUMENTS

| | | | |
|---|---|---|---|
| 2004/0019789 A1* | 1/2004 | Buer | G06F 21/57 |
| | | | 726/28 |
| 2005/0198404 A1 | 9/2005 | Kawakami et al. | |
| 2010/0328715 A1 | 12/2010 | Hara | |
| 2014/0043059 A1 | 2/2014 | Speers et al. | |
| 2020/0210256 A1* | 7/2020 | Chitnis | G06F 9/45558 |

* cited by examiner

ACCELERATOR CONTROL SYSTEM AND ACCELERATOR CONTROL METHOD

CROSS-REFERENCE TO RELATED APPLICATIONS

This application is a National Stage application under 35 U.S.C. § 371 of International Application No. PCT/JP2019/032770, having an International Filing Date of Aug. 22, 2019. The disclosure of the prior application is considered part of the disclosure of this application, and is incorporated in its entirety into this application.

TECHNICAL FIELD

The present invention relates to an accelerator control system and an accelerator control method.

BACKGROUND ART

There are an increasing number of cases where a part of processing of a software application (hereinafter referred to as APL) is offloaded to an accelerator such as a graphics processing unit (GPU) or a field programmable gate array (FPGA) to achieve a performance and power efficiency that cannot be achieved by software (CPU processing) alone.
A case of applying an accelerator as described above in a large-scale server cluster such as a data center constituting Network Functions Virtualization (NFV) or a Software Defined Network (SDN) is assumed (see NPL 1).

Offloading of a server load factor in the related art will be described.

FIG. 11 is a schematic configuration diagram of an arithmetic system in which an arithmetic device specialized for specific processing is added to a general-purpose computer. The left diagram of FIG. 11 is a configuration diagram of a non-programmable arithmetic system 10A (to which no function can be added).

The arithmetic system 10A illustrated in the left diagram of FIG. 11 includes a CPU 11 and a network interface card (NIC) 12 for connection to a communication network. The CPU 11 is a core processor with a plurality of cores 11a. The left diagram of FIG. 11 represents an image of a situation in which the cores 11a are used for an APL and packet processing. As illustrated by the thin arrow in the left diagram of FIG. 11, the CPU 11 in the arithmetic system 10A must perform packet processing prior to execution of the APL (or parallel processing of packet processing and the APL), and thus the processing speed is low.

An arithmetic system 10B illustrated in the right diagram of FIG. 11 includes a SmartNIC 13 that is an NIC with an accelerator, instead of the NIC 12. The SmartNIC 13 is an NIC that can reduce the load on the CPU 11 by offloading load-intensive processing such as IP packet processing that causes a lower processing capability. The SmartNIC 13 can be programmed to be an arithmetic circuit for packet processing and offload the packet processing program (see reference sign a in FIG. 11). As indicated by the thick arrow in the right diagram of FIG. 11, the use of SmartNIC 13 can improve, for example, a processing capability by acceleration in a virtual server environment.

FIGS. 12 and 13 are diagrams describing a function offloading a function of software running on a general-purpose server to an accelerator board. As illustrated in FIGS. 12 and 13, the general-purpose server 30 offloads the function of software running on the general-purpose server 30 to an FPGA function unit 41 of the accelerator board 40 to achieve a higher speed and reduction in CPU resources. Further, virtualization has increased the number of cases in which a plurality of user terminals 22 coexists in the same general-purpose server 30 and the number of cases in which a system operator 21 uses the accelerator board 40 to provide a plurality of functions to the plurality of user terminals 22 even in a general-purpose server 30 in which the accelerator board 40 is installed.

CITATION LIST

Non Patent Literature

NPL 1: Tanisho, et al., "Initiatives for development of SmartNIC firmware using P4/C", [online], OkinawaOpenDays2017. [retrieved on Aug. 1, 2019], Internet, <URL:https://www.okinawaopenlabs.com/ood/2017/wp-content/uploads/sites/4/2017/12/fujitsu_3.pdf>

SUMMARY OF THE INVENTION

Technical Problem

However, there is a concern in the technology of the related art that there is a possibility of a person who can operate a server (such as a system operator or a person making unauthorized access) unintentionally or maliciously rewriting the content of an accelerator, which may hinder proper management of the accelerator. There is a problem that the accelerator performs an unintended operation when functions of the accelerator are rewritten due to an operation error made by a system operator or a malicious user.

For example, as indicated by reference sign b in FIG. 12, a system operator 21 may offload the function of software running on the general-purpose server 30 (<function 1>) to the FPGA function unit 41 of the accelerator board 40. However, in cases where functions are frequently updated, a timing of function development is different from a timing of rewriting on the accelerator, or the like, the system operator 21 may make an operation error that causes the accelerator to be rewritten with a function that is different from the original function (see <function 1*> of the FPGA function unit 41). In such a case, because <function 1*> that is different from the expected <function 1> is offloaded to the FPGA function unit 41 of the accelerator board 40 as indicated by reference sign c in FIG. 12, an operation will be different from an expected operation.

In addition, a malicious user 22 may arbitrarily rewrite the FPGA function unit 41 of the accelerator board 40 as indicated by reference sign d in FIG. 13. In such a case, as indicated by reference sign e in FIG. 13, the system operator 21 who has a problem that a necessary function to be used by a non-malicious user, that is, a user who is eligible for using the function cannot be used.

The present invention has been made in view of this background, and an object of the present invention is to prevent an accelerator function from being rewritten and prevent an unintended operation.

Means for Solving the Problem

To solve the above-described problems, the present invention is an accelerator control system that offloads application-specific processing of a general-purpose server to an accelerator function unit on an accelerator board, in which the general-purpose server includes an accelerator rewriting unit configured to rewrite an accelerator function of the accelerator function unit, a server-side digest information generating unit configured to binarize the accelerator function to generate first digest information of the accelerator function, and a server management unit configured to compare the first digest information created before the accelerator function is implemented on the accelerator function unit with second digest information notified from the accelerator board and determine whether the accelerator function is rewritten, and the accelerator board includes an accelerator-side digest information generating unit configured to generate the second digest information of the accelerator function written in the accelerator function unit, and an accelerator management unit configured to notify the general-purpose server serving as a rewriting source of the second digest information generated.

Effects of the Invention

According to the present invention, it is possible to prevent an accelerator function from being rewritten and prevent an unintended operation.

DESCRIPTION OF EMBODIMENTS

Hereinafter, a network system and the like in a mode for implementing the present invention (hereinafter referred to as "the present embodiment") will be described with reference to the diagrams.

Description of Principle

Figure 1:
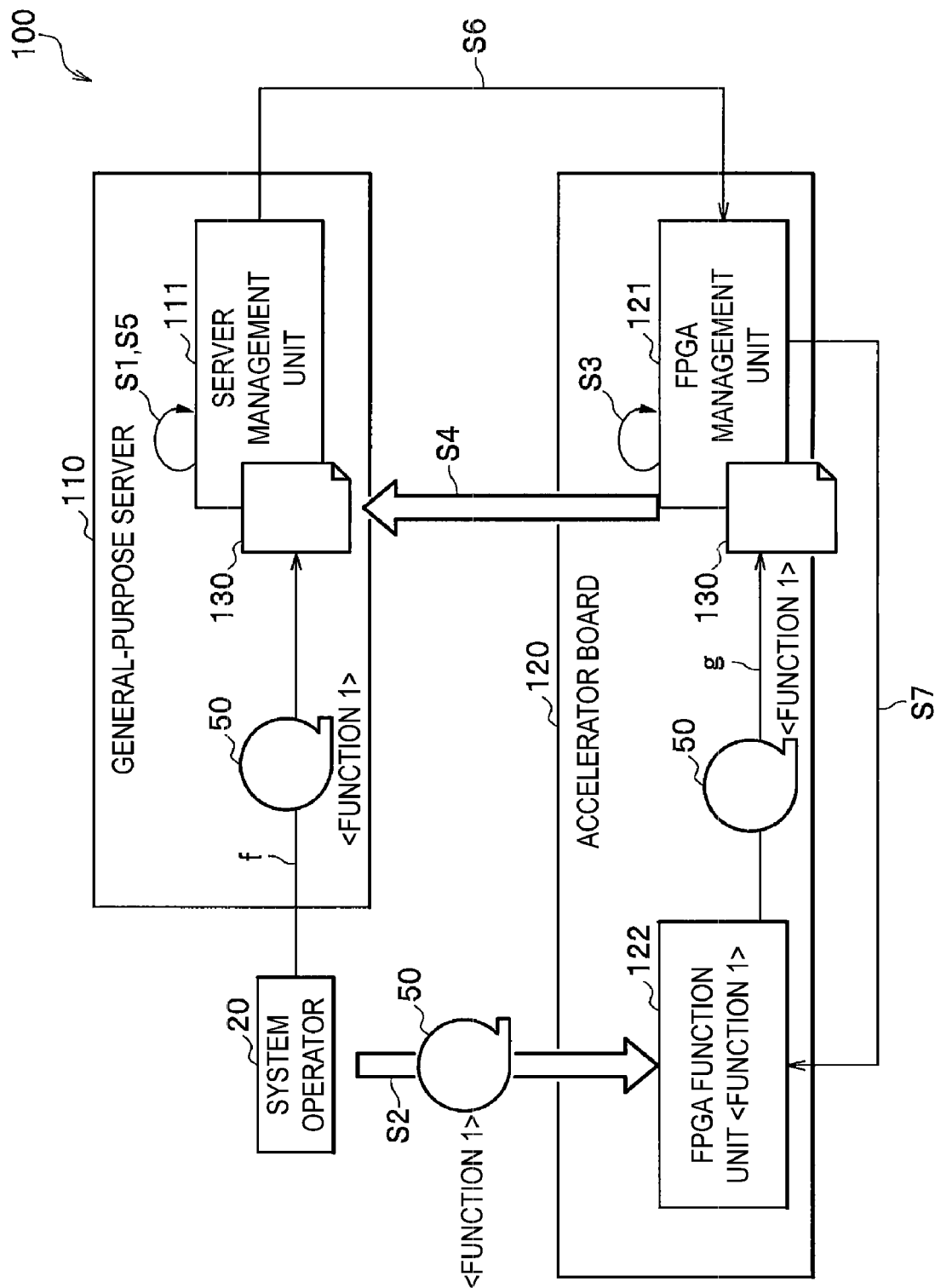
FIG. 1 is a diagram illustrating a configuration example of an accelerator control system for describing the principle of the present invention.

FIG. 1 is a diagram illustrating a configuration example of an accelerator control system 100 for describing the principle of the present invention.

The accelerator control system 100 includes a general-purpose server 110 and an accelerator board 120 as illustrated in FIG. 1. The general-purpose server 110 and the accelerator board 120 are connected by SW or a network which is not illustrated. Further, a form in which the accelerator board 120 is connected to the general-purpose server 110 inside the general-purpose server is also included (for example, a connection by a bus on a motherboard).

In the accelerator control system 100, application-specific processing of the general-purpose server 110 is offloaded to the FPGA function unit 122 (an accelerator function unit) on the accelerator board 120.

General Purpose Server 110

The general-purpose server 110 is a computer apparatus (hardware) or software that functions to provide information and processing results in response to a request from a client (a system operator 20).

The general-purpose server 110 includes a server management unit 111 provided in one set with an FPGA management unit 121 (an accelerator management unit) of the accelerator board 120. The server management unit 111 creates and retains digest information 130 (described below in FIG. 6) of an accelerator function before implementing the accelerator function on the accelerator board 120. The server management unit 111 compares the previously created digest information 130 with digest information 130 notified by the FPGA management unit 121 of the accelerator board 120 and determines that the accelerator function has not been rewritten when two pieces of the digest information 130 match. When two pieces of the digest information 130 do not match or the notification of the digest information 130 is stopped, the server management unit 111 determines that the accelerator function is rewritten and requests reimplementation of the accelerator.

Accelerator Board 120

The accelerator board 120 is equipped with an accelerator such as an FPGA that offloads a load-intensive processing to mitigate the load of the general-purpose server 110.

The accelerator board 120 includes the FPGA management unit 121 and an FPGA function unit 122 (an accelerator function unit).

The FPGA management unit 121 is provided in one set with the server management unit 111 of the general-purpose server 110. The FPGA management unit 121 creates the digest information 130 of the FPGA function unit 122 and periodically notifies the server management unit 111 of the general-purpose server 110 of the digest information.

The FPGA function unit 122 is an accelerator provided in the accelerator board 120, and any accelerator is applicable.

System Operator 20

The system operator 20 offloads an accelerator file 50 (see <function 1> of FIG. 1) in which a function of software running on the general-purpose server 110 is described to the FPGA function unit 122 of the accelerator board 120.

In the configuration described above, the server management unit 111 of the general-purpose server 110 creates and retains digest information 130 of an accelerator function in accordance with the accelerator file 50 from the system operator 20 (see reference sign fin FIG. 1) before the accelerator function is implemented on the accelerator board 120 (see step S1).

The system operator 20 implements the accelerator function on the FPGA function unit 122 of the accelerator board 120 (see step S2). Here, the system operator 20 offloads the accelerator file 50 (see <function 1> of FIG. 1) in which the function of software running on the general-purpose server 110 is described to the FPGA function unit 122 of the accelerator board 120.

The FPGA management unit 121 of the accelerator board 120 creates and retains digest information 130 of the accelerator function in accordance with the accelerator file 50 (see reference sign g in FIG. 1) offloaded to the FPGA function unit 122 (see step S3). In addition, the FPGA management unit 121 periodically notifies the server management unit 111 of the general-purpose server 110 of the created digest information 130 (see step S4).

The server management unit 111 of the general-purpose server 110 compares the previously created and retained digest information 130 with the digest information 130 notified by the FPGA management unit 121 of the accelerator board 120 to determine rewriting of the accelerator function (see step S5). When two pieces of the digest information 130 match, the server management unit 111 determines that the accelerator function has not been rewritten. When "implementation of the accelerator" of step S2 described above is performed without passing through "creation of digest information" in step S1 described above, two pieces of the digest information 130 do not match in "determination of rewriting of the accelerator function" in step S5 described above.

The server management unit 111 of the general-purpose server 110 determines that the acceleration function has been rewritten when two pieces of the digest information 130 do not match or the notification of the digest information 130 is stopped and instructs the FPGA management unit 121 of the accelerator board 120 to stop the accelerator function (see step S6).

The FPGA management unit 121 of the accelerator board 120 receives the instruction to stop the accelerator function from the server management unit 111 of the general-purpose server 110 and issues a command to stop the accelerator function of the FPGA function unit 122 (see step S7). The FPGA management unit 121 may stop the accelerator function until the function of the accelerator is normalized.

When a user has a malicious intention, the user may falsify the digest information 130 to make it look as if the acceleration function has not been rewritten.

The following is added to deal with the above case.

Figure 2:
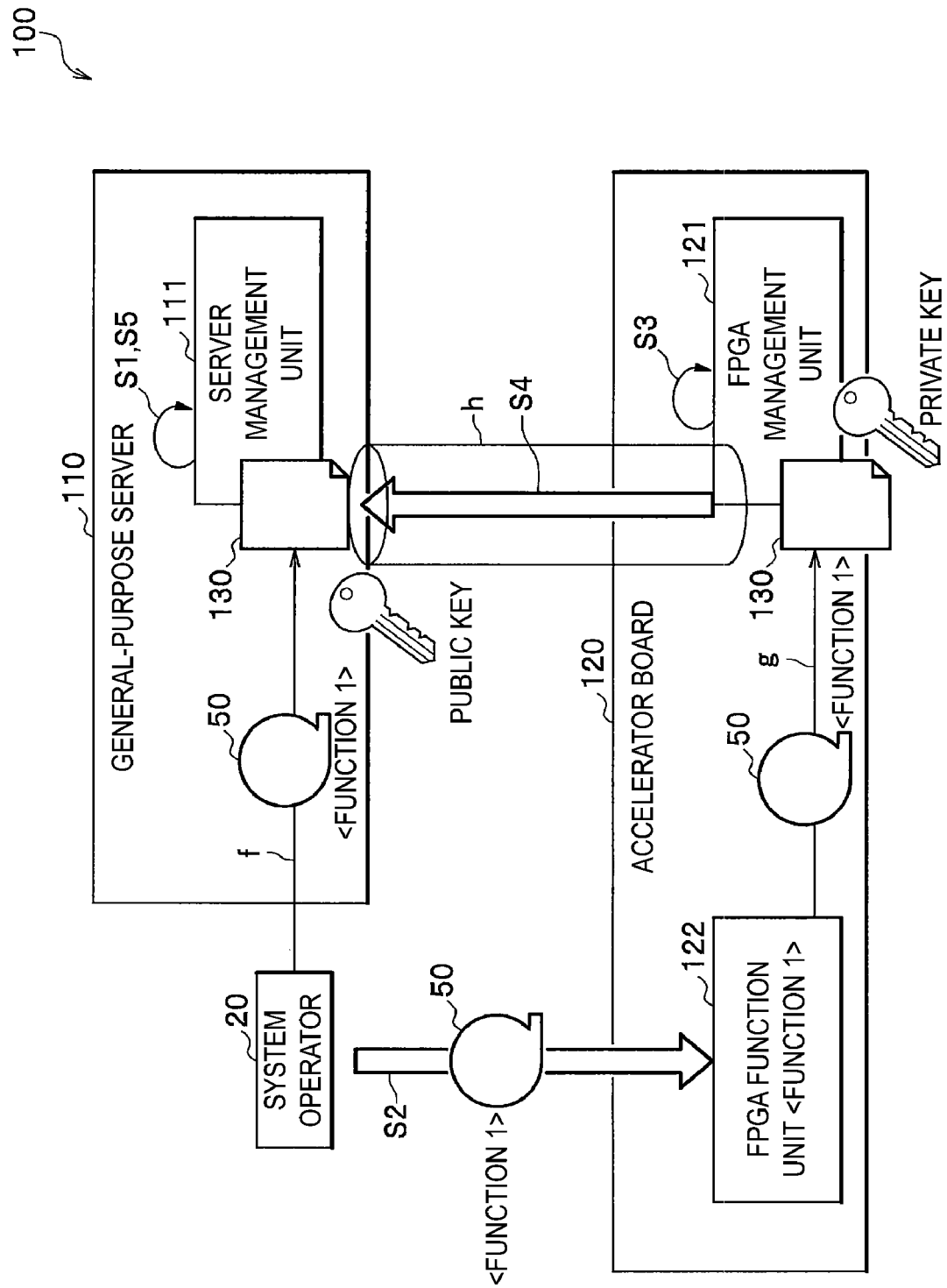
FIG. 2 is a diagram illustrating a configuration example of the accelerator control system for describing the principle of the present invention.

FIG. 2 is a diagram illustrating a configuration example of the accelerator control system 100 for describing the principle of the present invention. The same reference signs are given to the same constituent parts as those in FIG. 1, and overlapping description will be omitted. The FPGA management unit 121 of the accelerator board 120 encrypts the created digest information 130 with a private key that only the FPGA management unit 121 and the server management unit 111 know and periodically notifies the server management unit 111 of the general-purpose server 110 of the encrypted digest information (see step S4). Further, a virtual private network (VPN) connection between networks made in, for example, a layer 2 tunneling protocol (L2TP) or IPsec tunnel is represented by the pipe of reference sign h of FIG. 2.

The server management unit 111 of the general-purpose server 110 uses a public key to decrypt the digest information 130. In addition, the server management unit 111 compares the previously created and retained digest information 130 with the digest information 130 notified by the FPGA management unit 121 of the accelerator board 120 to determine rewriting of the accelerator function (see step S5). When two pieces of the digest information 130 match, the server management unit 111 determines that the accelerator function has not been rewritten.

Embodiment

The present embodiment takes an FPGA as an example of an accelerator and the general-purpose server 110 equipped with the accelerator board 120 as an example.

Configuration of Accelerator Control System 100

Figure 3:
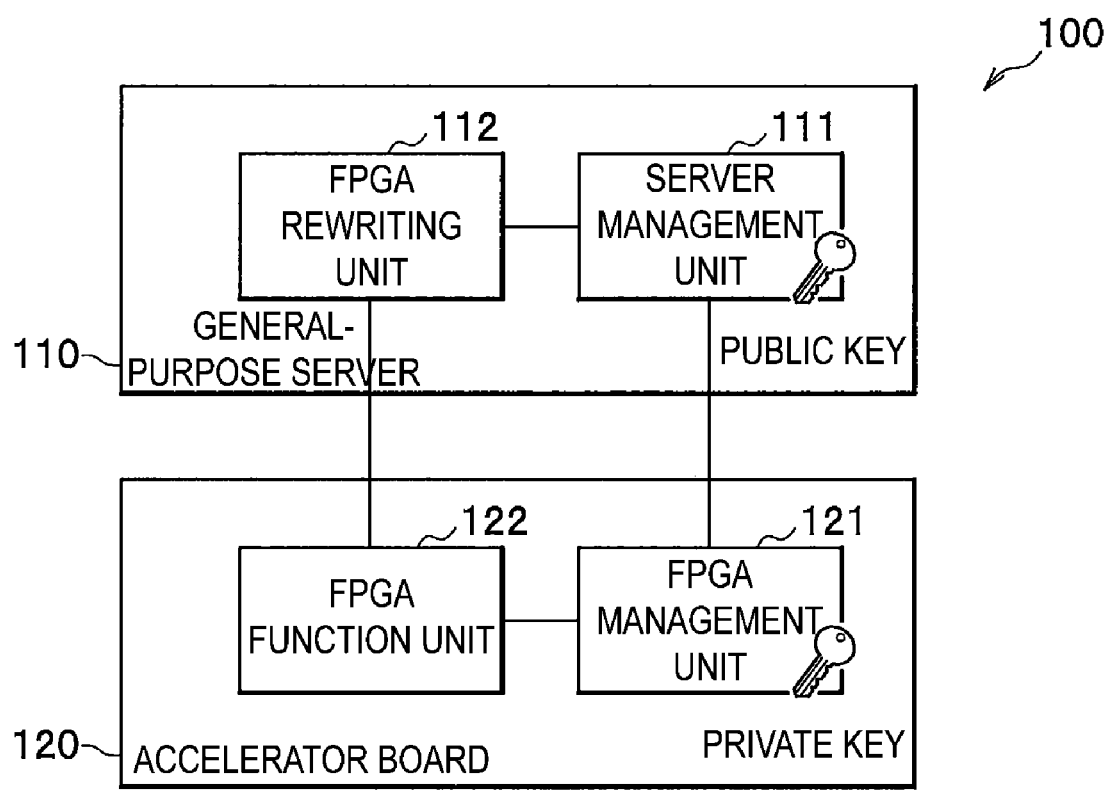
FIG. 3 is a diagram illustrating a configuration example of the accelerator control system according to an embodiment of the present invention.
Figure 4:
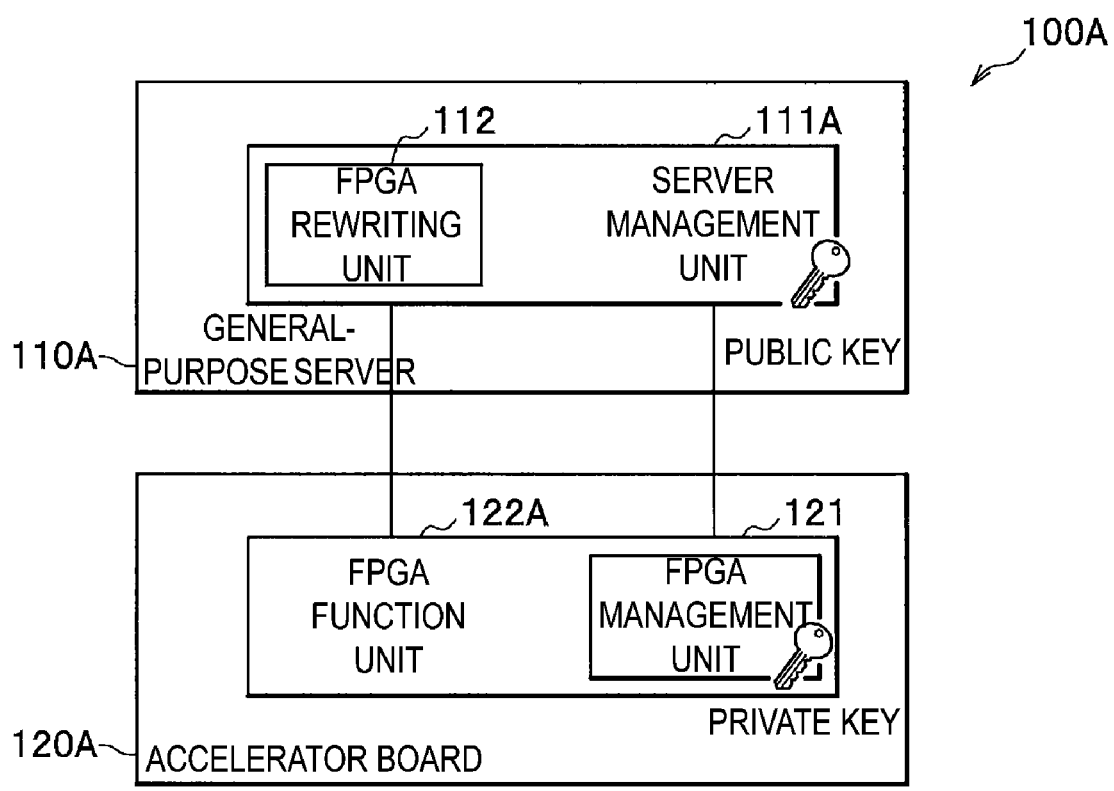
FIG. 4 is a diagram illustrating a configuration example of an accelerator control system according to an embodiment of the present invention.

FIGS. 3 and 4 are diagrams illustrating configuration examples of the accelerator control system 100 according to an embodiment of the present invention. The same reference signs are given to the same constituent parts as those in FIG. 1, and overlapping description will be omitted.

The accelerator control system 100 illustrated in FIG. 3 includes the general-purpose server 110 and the accelerator board 120.

The general-purpose server 110 includes the server management unit 111 and an FPGA rewriting unit 112 (an accelerator rewriting unit).

The server management unit 111 creates and retains digest information 130 of an accelerator function before the accelerator function is implemented on the FPGA function unit 122 of the accelerator board 120. The server management unit 111 compares the previously created digest information 130 with digest information 130 notified by the FPGA management unit 121 of the accelerator board 120 and determines that the accelerator function has not been rewritten when two pieces of the digest information 130 match. The server management unit 111 determines that the accelerator function is rewritten when two pieces of the digest information 130 do not match or the notification of the digest information 130 is stopped and requests reimplementation of the accelerator.

The FPGA rewriting unit 112 (the accelerator rewriting unit) rewrites the FPGA function to be offloaded to the FPGA function unit 122 of the accelerator board 120.

The accelerator board 120 includes the FPGA management unit 121 and the FPGA function unit 122.

The FPGA management unit 121 creates the digest information 130 of the FPGA function unit 122 and periodically notifies the server management unit 111 of the general-purpose server 110 of the digest information.

The FPGA function unit 122 is an accelerator provided in the accelerator board 120.

The accelerator control system 100 illustrated in FIG. 3 needs to have the FPGA management unit 121 provided in the form of hardware or software in the accelerator board 120. The accelerator control system 100 illustrated in FIG. 3 has the advantage that a system operator or the like can create an FPGA file. However, an idea for operating the FPGA management unit 121 in the accelerator board 120 is needed.

In addition, an accelerator control system 100A illustrated in FIG. 4 includes a general-purpose server 110A and an accelerator board 120A.

The general-purpose server 110A has the FPGA rewriting unit 112 illustrated in FIG. 3 in the server management unit 111A.

The accelerator board 120A is provided with the FPGA management unit 121 illustrated in FIG. 3 in the FPGA function unit 122A.

The accelerator control system 100A illustrated in FIG. 4 has the advantage that the FPGA management unit 121 is incorporated as a part of an FPGA function as intellectual property (IP). However, to prevent a private key from being known to users, the FPGA rewriting unit 112 needs to be included in the server management unit 111A.

Although the accelerator control system 100A illustrated in FIG. 4 does not need a special board, the administrator also needs to be responsible for creating an FPGA file until an FPGA file is created.

The accelerator control system 100 illustrated in FIG. 3 will be used as an example, and a detailed configuration of each of functional units will be described below.

Detailed Configuration of Accelerator Control System 100

Figure 5:
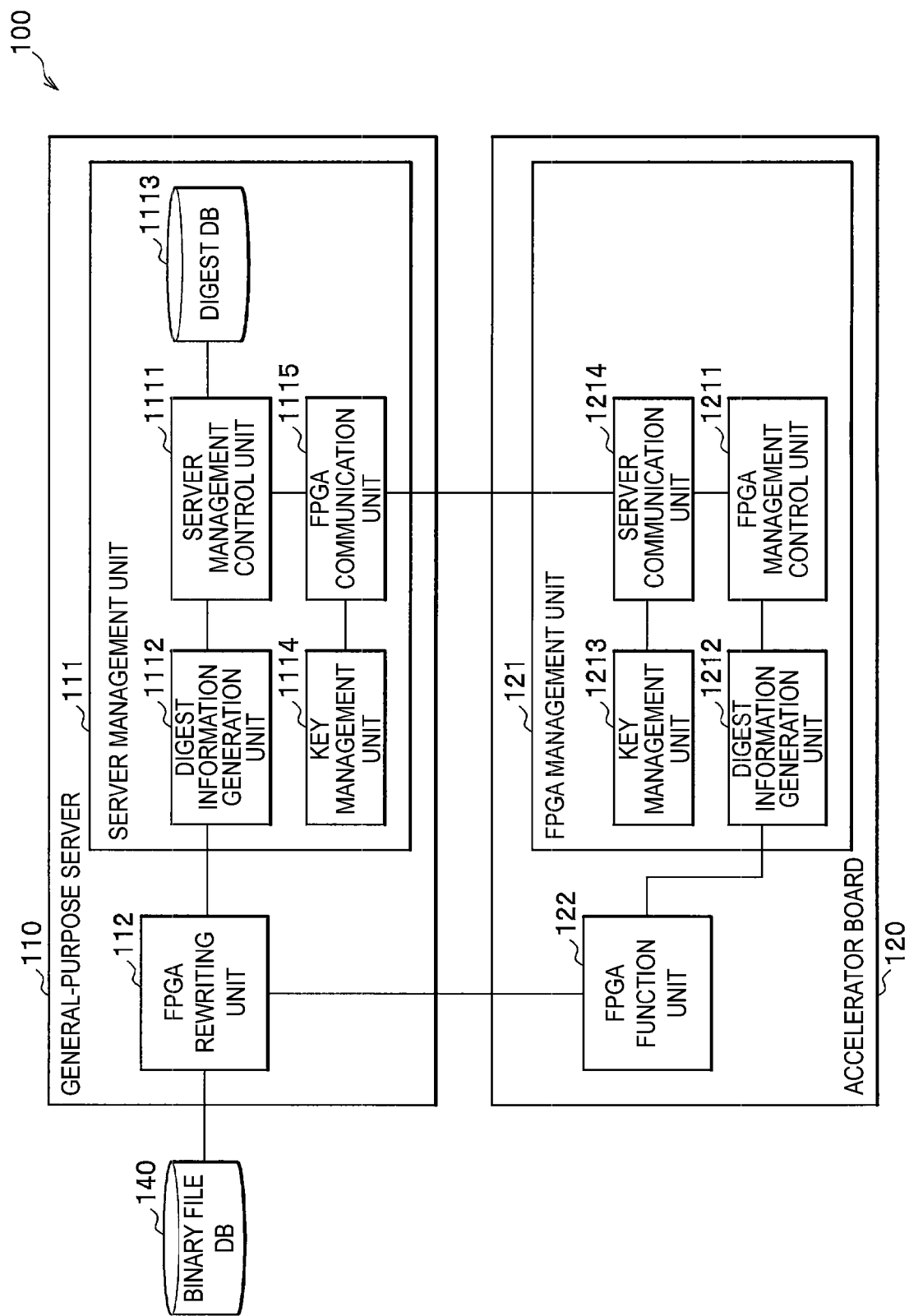
FIG. 5 is a diagram illustrating a detailed configuration example of the accelerator control system according to an embodiment of the present invention.

FIG. 5 is a diagram illustrating a detailed configuration example of the accelerator control system 100 according to an embodiment of the present invention. The same reference signs are given to the same constituent parts as those in FIG. 3, and overlapping description is omitted. The accelerator control system 100 includes the general-purpose server 110 and the accelerator board 120 as illustrated in FIG. 5. The general-purpose server 110 and the accelerator board 120 are connected by SW or a network which is not illustrated. A binary file DB 140 is connected to the general-purpose server 110.

General Purpose Server 110

The general-purpose server 110 includes the server management unit 111 and the FPGA rewriting unit 112 (an accelerator rewriting unit).

The server management unit 111 includes a server management control unit 1111, a digest information generation unit 1112 (a server-side digest information generation unit), a digest DB 1113, a key management unit 1114 (a public key management unit), and an FPGA communication unit 1115. The FPGA rewriting unit 112 rewrites an FPGA of the FPGA function unit 122 (an accelerator function unit) (which has a restoration function in rewriting failure).

The server management control unit 1111 compares two pieces of the digest information 130 (see FIG. 6 described below) and determines whether the FPGA has been rewritten. Specifically, the server management control unit 1111 compares digest information 130 created before the accelerator function is implemented on the FPGA function unit 122 and retained in the digest DB 1113 (see the digest information 130A in FIG. 7 described below) with the digest information 130 notified by the accelerator board 120 (see the digest information 130B in FIG. 7 described below) and determines whether the accelerator function has been rewritten.

When the digest information 130 created before the accelerator function is implemented on the FPGA function unit 122 (see the digest information 130A in FIG. 7 described below) does not match the digest information 130 notified by the accelerator board 120 (see the digest information 130B in FIG. 7 described below), the server management control unit 1111 determines that the accelerator function has been rewritten and requests the FPGA management control unit 1211 to reimplement the accelerator function.

When the digest information 130 created before the accelerator function is implemented on the FPGA function unit 122 (see the digest information 130A in FIG. 7 described below) does not match the digest information 130 notified by the accelerator board 120 (see the digest information 130B in FIG. 7 described below), the server management control unit 1111 instructs the FPGA management control unit 1211 to stop the FPGA function unit 122 until the accelerator function is normalized.

The server management control unit 1111 decrypts, with a public key, the digest information 130 (see the digest information 130B in FIG. 7 described below) encrypted and notified by the accelerator board 120.

The digest information generation unit 1112 binarizes the accelerator function to generate digest information of the accelerator function. Specifically, the digest information generation unit 1112 generates the digest information 130 in accordance with a binary file 140A (see FIG. 6) stored in the binary file DB 140.

The digest DB 1113 retains an identifier of the binary file 140A and its digest information 130 for implementation on the FPGA.

The key management unit 1114 manages the public key of the FPGA management unit 121 to be used for communication.

The FPGA communication unit 1115 communicates with a server communication unit 1214 of the FPGA management unit 121.

Accelerator Board 120

The accelerator board 120 includes the FPGA management unit 121 and the FPGA function unit 122.

The FPGA management unit 121 includes an FPGA management control unit 1211, a digest information generation unit 1212 (an accelerator-side digest information generation unit), a key management unit 1213 (a private key management unit), and the server communication unit 1214. The FPGA function unit 122 is an FPGA body serving as a rewriting target.

The FPGA management control unit 1211 creates the digest information 130 of the FPGA function unit 122 on the accelerator board 120 and periodically notifies the server management control unit 1111 of the general-purpose server 110 serving as a rewriting source of the generated digest information 130 (see the digest information 130B in FIG. 7 described below).

The FPGA management control unit 1211 encrypts the generated digest information 130 with a private key that only the server management control unit 1111 knows and then notifies the server management control unit of the encrypted digest information.

The FPGA management control unit 1211 stores the function written in the FPGA function unit 122 and the server management unit 111 serving as the rewriting source and transmits the digest information 130 (see the digest information 130B in FIG. 7 described below) destined for the target server management control unit 1111 to the server communication unit 1214.

The digest information generation unit 1212 generates the digest information 130 of the accelerator function written to the FPGA function unit 122.

The digest information generation unit 1212 has the same function as the digest information generation unit 1112 of the server management unit 111 of the general-purpose server 110, and binarizes the accelerator function to generate the digest information 130 of the accelerator function.

The key management unit 1213 manages a private key of the FPGA management unit 121 to be used for communication.

The server communication unit 1214 communicates with the FPGA communication unit 1115 of the server management unit 111 of the general-purpose server 110.

Digest Information 130

Next, the digest information 130 will be described.

The digest information 130 is generated by the digest information generation unit 1112 of the general-purpose server 110 (see FIG. 5) or the digest information generation unit 1212 of the accelerator board 120.

The same digest information 130 is generated on the general-purpose server 110 side and the accelerator board 120 side. Thus, the digest information generation unit 1112 of the general-purpose server 110 and the digest information generation unit 1212 of the accelerator board 120 use the same algorithm for generating digest information. In other words, the digest information generation unit 1112 of the general-purpose server 110 and the digest information generation unit 1212 of the accelerator board 120 adopt the same configuration.

Figure 6:
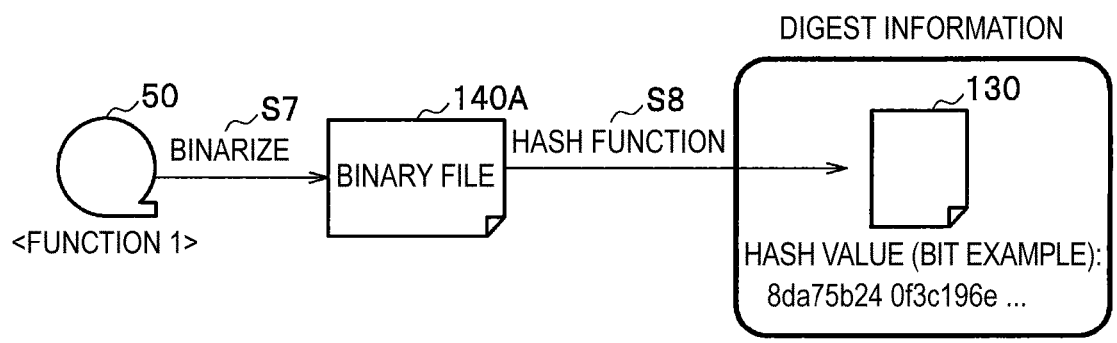
FIG. 6 is a diagram illustrating an example of generation of digest information in the accelerator control system according to an embodiment of the present invention.

FIG. 6 is a diagram for describing an example of generation of the digest information 130. The digest information generation unit 1112 of the general-purpose server 110 (see FIG. 5) (the same applies to the digest information generation unit 1212 of the accelerator board 120) binarizes an accelerator file 50 (here, <function 1>) to convert <function 1> to a binary file 140A (see step S7).

After converting <function 1> to the binary file 140A, the digest information generation unit 1112 calculates the hash value using a hash function algorithm such as the message digest algorithm 5 (MD5) or Secure Hash Algorithm (SHA) (see step S8). This hash value is set as the digest information 130. The hash value (bit sequence) is, for example, 8da75b24 0f3c196e . . . .

As described above, both the general-purpose server 110 and the accelerator board 120 need to use the same hash algorithm.

Figure 7:
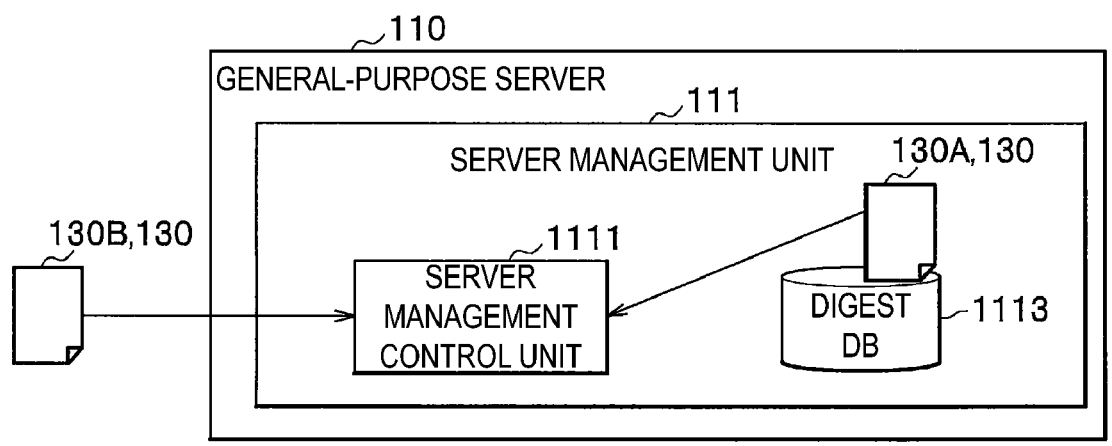
FIG. 7 is a diagram illustrating an example of matching/mismatching determination logic for comparing digest information in the accelerator control system according to an embodiment of the present invention.

FIG. 7 is a diagram for describing an example of match/mismatch determination logic for comparison of the digest information 130.

As illustrated in FIG. 7, the server management unit 111 of the general-purpose server 110 is storing the digest information 130A generated by the digest information generation unit 1112 (see FIG. 5) of the general-purpose server 110 in the digest DB 1113.

In addition, the digest information 130B illustrated in FIG. 7 is digest information generated by the accelerator board 120 (see FIG. 5).

The server management unit 111 of the general-purpose server 110 determines match/mismatch in accordance with the digest information (hash values) generated in each of the general-purpose server 110 and the accelerator board 120. In the example of FIG. 7, the server management unit 111 compares the hash value of the digest information 130A with the hash value of the digest information 130B and determines that the hash values match if the hash values are in the same bit sequence.

Hereinafter, an accelerator control method of the accelerator control system 100 configured as described above will be described.

Flowchart

Figure 8:
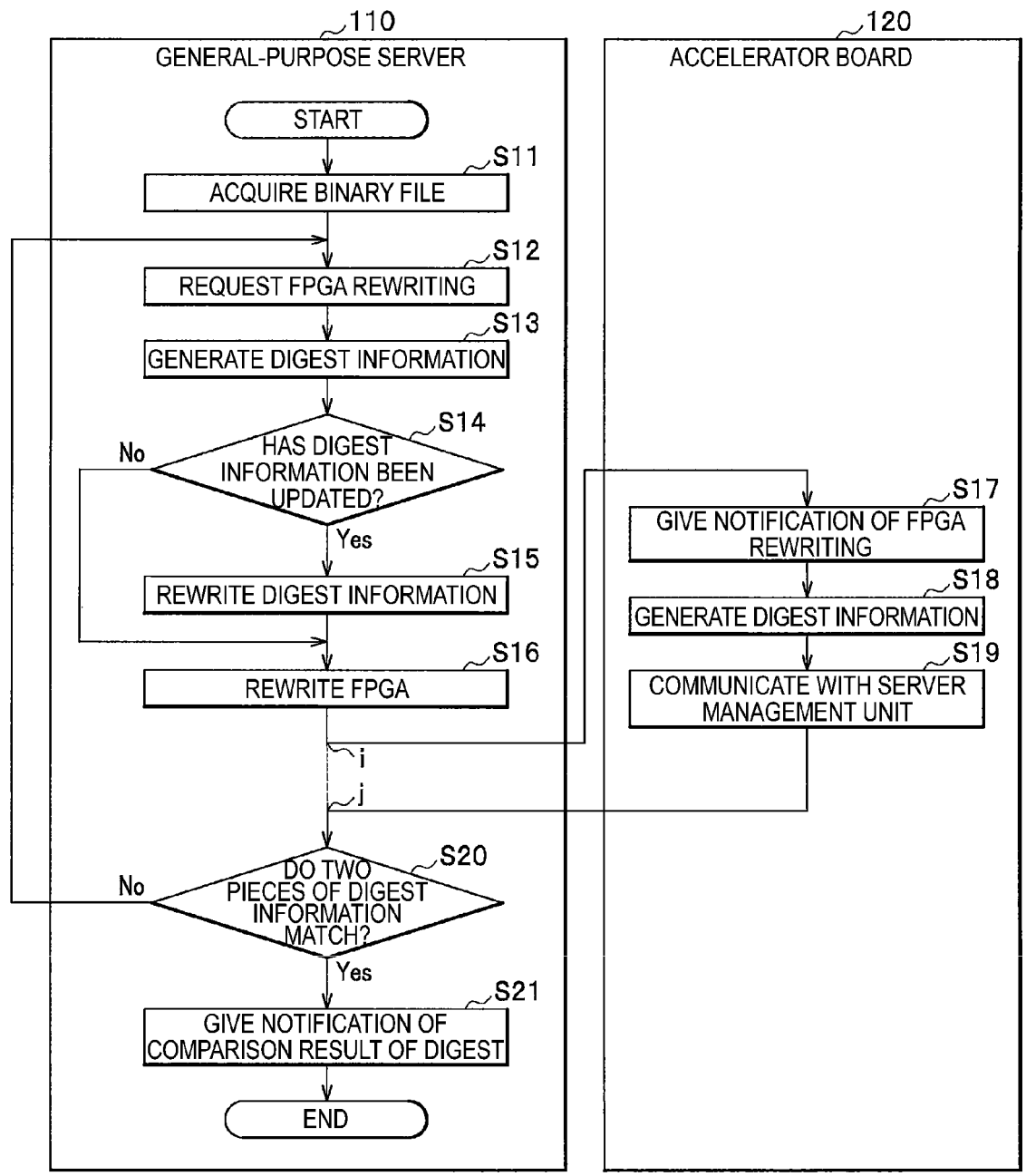
FIG. 8 is a flowchart illustrating accelerator control processing of the accelerator control system according to an embodiment of the present invention.

FIG. 8 is a flowchart illustrating accelerator control processing of the accelerator control system 100 (see FIG. 5). For the sake of convenience in explanation, the accelerator control processing performed by the general-purpose server 110 (see FIG. 5) and the accelerator control processing performed by the accelerator board 120 (see FIG. 5) are summarized in one flowchart in FIG. 8. For this reason, the processing by the general-purpose server 110 and the processing by the accelerator board 120 are performed asynchronously. A transition from the general-purpose server 110 to the accelerator board 120 and a transition from the accelerator board 120 to the general-purpose server 110 are performed while notification and permission given between the two entities are awaited (see the control sequence of FIG. 9).

The flow starts with a rewriting command issued from a user terminal to the FPGA rewriting unit 112 of the general-purpose server 110 (see FIG. 5).

In step S11, the FPGA rewriting unit 112 (see FIG. 5) of the general-purpose server 110 requests acquisition of the binary file 140A from the binary file DB 140.

In step S12, the FPGA rewriting unit 112 of the general-purpose server 110 requests FPGA rewriting from the digest information generation unit 1112 of the server management unit 111.

In step S13, the digest information generation unit 1112 (see FIG. 5) of the server management unit 111 generates the digest information 130 in accordance with the received binary file 140A (see "generation of digest information" in FIG. 6). Then, the digest information generation unit 1112 sends the identifier of the binary file 140A and the generated digest information 130 to the server management control unit 1111.

In step S14, the server management control unit 1111 (see FIG. 5) of the server management unit 111 determines whether the digest information 130 has been updated. Specifically, the server management control unit 1111 requests existing digest information 130 for the identifier (not illustrated) of the binary file 140A from the digest DB 1113 and compares the existing digest information 130 with the digest information 130 sent in step S13. When the digest information 130 has been updated, the processing proceeds to step S15, and when the digest information 130 has not been updated, the processing proceeds to step S16.

In step S15, the server management control unit 1111 of the server management unit 111 rewrites the digest information 130 stored in the digest DB 1113 with the identifier of the binary file 140A and the new digest information 130.

In step S16, the server management control unit 1111 of the server management unit 111 performs FPGA rewriting using the FPGA rewriting unit 112 (see FIG. 5). Specifically, the server management control unit 1111 permits the FPGA rewriting unit 112 to perform FPGA rewriting via the digest information generation unit 1112. Then, the FPGA rewriting unit 112 of the server management unit 111 acquires a backup from the FPGA function unit 122 (see FIG. 5) of the current accelerator board 120 and requests FPGA rewriting from the FPGA function unit 122 (see reference sign i in FIG. 8).

Here, basic control is that FPGA rewriting is permitted when the digest information 130 has been updated. In addition, permitting rewriting may be controlled in accordance with the history, units of users, units of files, timings, and the like.

At step S17, after the FPGA rewriting is performed, the FPGA function unit 122 of the accelerator board 120 notifies the FPGA rewriting unit 112 of the general-purpose server 110 of the fact that the FPGA rewriting has been completed and notifies the digest information generation unit 1112 of the FPGA management unit 121 of the fact that the FPGA rewriting has been completed with the binary file 140A.

In step S18, the digest information generation unit 1112 of the FPGA management unit 121 of the accelerator board 120 generates the digest information 130 in accordance with the received binary file 140A. Then, the FPGA management unit 121 sends the identifier of the binary file 140A and the generated digest information 130 to the FPGA management control unit 1211.

In step S19, the FPGA management control unit 1211 of the accelerator board 120 sends the identifier of the binary file 140A and its digest information 130 to the server management control unit 1111 by using the FPGA communication unit 1115. Specifically, the FPGA management control unit 1211 stores the function written on the FPGA function (the identifier of the binary file 140A) and requests communication with the server management unit 111 from the server communication unit 1214. The server communication unit 1214 requests a private key necessary for cryptographic communication from the key management unit 1114 and sends the identifier of the encrypted binary file 140A and its digest information 130 to the FPGA communication unit 1115. The FPGA communication unit 1115 receives the identifier of the encrypted binary file 140A and its digest information 130 and requests a public key from the key management unit 1114. After decryption, the identifier of the binary file 140A and its digest information 130 are sent to the server management control unit 1111.

As indicated by reference sign j in FIG. 8, the server management control unit 1111 of the server management unit 111 continues the following processing after the digest information 130 from the accelerator board 120 is prepared. In step S20, the server management control unit 1111 of the server management unit 111 determines whether two pieces of the digest information 130 match. Specifically, the server management control unit 1111 requests the existing digest information 130 for the identifier of the binary file 140A from the digest DB 1113 and compares the digest information 130 rewritten in step S15 described above with the digest information 130 received in step S19 described above. When two pieces of the digest information 130 do not match, the server management control unit 1111 determines that unexpected rewriting has occurred and returns to step S12 to rewrite the FPGA to the original content in accordance with the backup of the FPGA function unit 122. When two pieces of the digest information 130 match, the processing proceeds to step S21.

In step S21, the server management control unit 1111 of the server management unit 111 notifies the FPGA rewriting unit 112 of the comparison result of two pieces of the digest information 130 through the digest information generation unit 1112. When the notification of the successful rewriting is received, the FPGA rewriting unit 112 deletes the backup of the FPGA function unit 122 and terminates the processing of the flow.

Control Sequence

Figure 9:
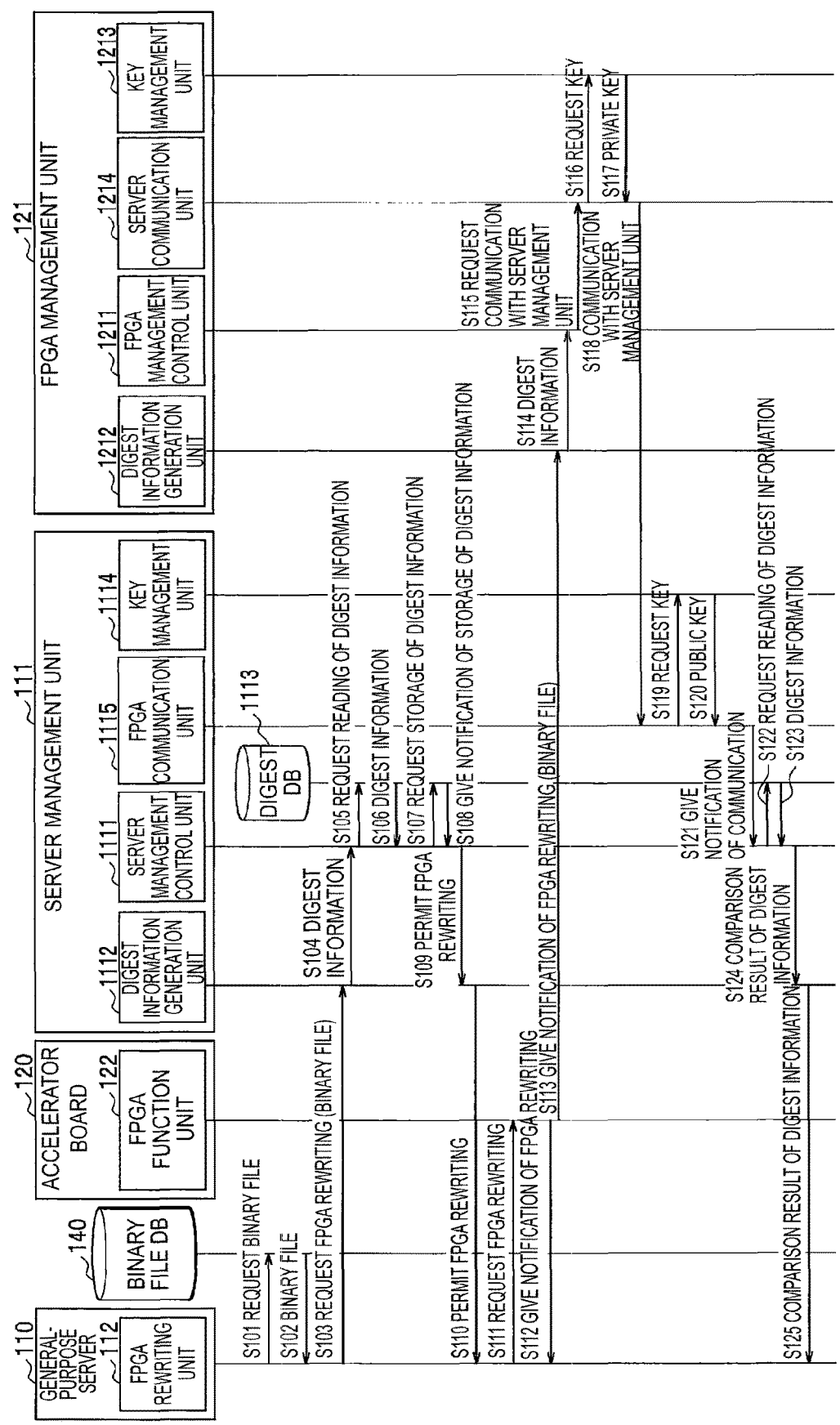
FIG. 9 is a control sequence diagram of the accelerator control processing of the accelerator control system according to an embodiment of the present invention.

FIG. 9 is a control sequence diagram of the accelerator control processing of the accelerator control system 100 (see FIG. 5). The control sequence of FIG. 9 is an example of a case in which the digest information 130 has been updated in step S14 of FIG. 8 (Yes in S14) and two pieces of the digest information 130 match in step S20 of FIG. 8 (Yes in S20).

The FPGA rewriting unit 112 (see FIG. 5) of the general-purpose server 110 requests the binary file 140A from the binary file DB 140 (see step S101).

The binary file DB 140 transmits the binary file 140A to the FPGA rewriting unit 112 (see step S102).

The FPGA rewriting unit 112 of the general-purpose server 110 requests FPGA rewriting (an FPGA rewriting request using the binary file 140A) from the digest information generation unit 1112 of the server management unit 111 (see step S103).

The digest information generation unit 1112 of the server management unit 111 transmits the digest information 130 to the server management control unit 1111 (see step S104).

The server management control unit 1111 requests reading of the digest information from the digest DB 1113 (see step S105).

The digest DB 1113 transmits the read digest information 130 to the server management control unit 1111 (see step S106).

The server management control unit 1111 requests storage of the digest information in the digest DB 1113 (see step S107). The digest DB 1113 notifies the server management control unit 1111 of the storage of the digest information (see step S108).

The server management control unit 1111 receives the notification on the storage of the digest information from the digest DB 1113 and issues an FPGA rewriting permission to the digest information generation unit 1112 (see step S109). The digest information generation unit 1112 of the server management unit 111 receives the FPGA rewriting permission and issues the FPGA rewriting permission to the FPGA rewriting unit 112 of the general-purpose server 110 (see step S110).

The FPGA rewriting unit 112 of the general-purpose server 110 requests FPGA rewriting from the FPGA function unit 122 (see FIG. 5) of the accelerator board 120 (see step S111). The FPGA function unit 122 of the accelerator board 120 notifies the FPGA rewriting unit 112 of the general-purpose server 110 of FPGA rewriting (see step S112).

On the other hand, the FPGA function unit 122 of the accelerator board 120 notifies the digest information generation unit 1212 of the FPGA management unit 121 of FPGA rewriting (notification on FPGA rewriting using the binary file 140A) (see step S113).

The digest information generation unit 1212 of the FPGA management unit 121 sends the digest information 130 to the FPGA management control unit 1211 (see step S114). The FPGA management control unit 1211 of the FPGA management unit 121 makes a request for communication with the server management unit 111 to the server communication unit 1214 (see step S115).

The server communication unit 1214 makes a request for a key to the key management unit 1213 (see step S116), and the key management unit 1213 sends a private key to the server communication unit 1214 (see step S117).

The server communication unit 1214 performs communication with the server management unit 111 to the FPGA communication unit 1115 of the server management unit 111 (see step S118).

The FPGA communication unit 1115 of the server management unit 111 makes a request for a key to the key management unit 1114 (see step S119), and the key management unit 1114 sends a public key to the FPGA communication unit 1115 (see step S120).

The FPGA communication unit 1115 of the server management unit 111 notifies the server management control unit 1111 of the communication (see step S121).

The server management control unit 1111 issues a request for reading the digest information from the digest DB 1113 (see step S122), and the digest DB 1113 sends the digest information 130 to the server management control unit 1111 (see step S123).

The server management control unit 1111 sends the comparison result of the digest information to the digest information generation unit 1112 (see step S124).

The digest information generation unit 1112 sends the received comparison result of the digest information to the FPGA rewriting unit 112 of the general-purpose server 110 (see step S125).

Further, although the FPGA function unit 122 of the accelerator board 120 actively performs the notification of the FPGA rewriting in step S113 described above, the digest information generation unit 1112 of the server management unit 111 may perform polling for the notification. The control sequence of the accelerator control processing is terminated with the above operation.

Hardware Configuration

Figure 10:
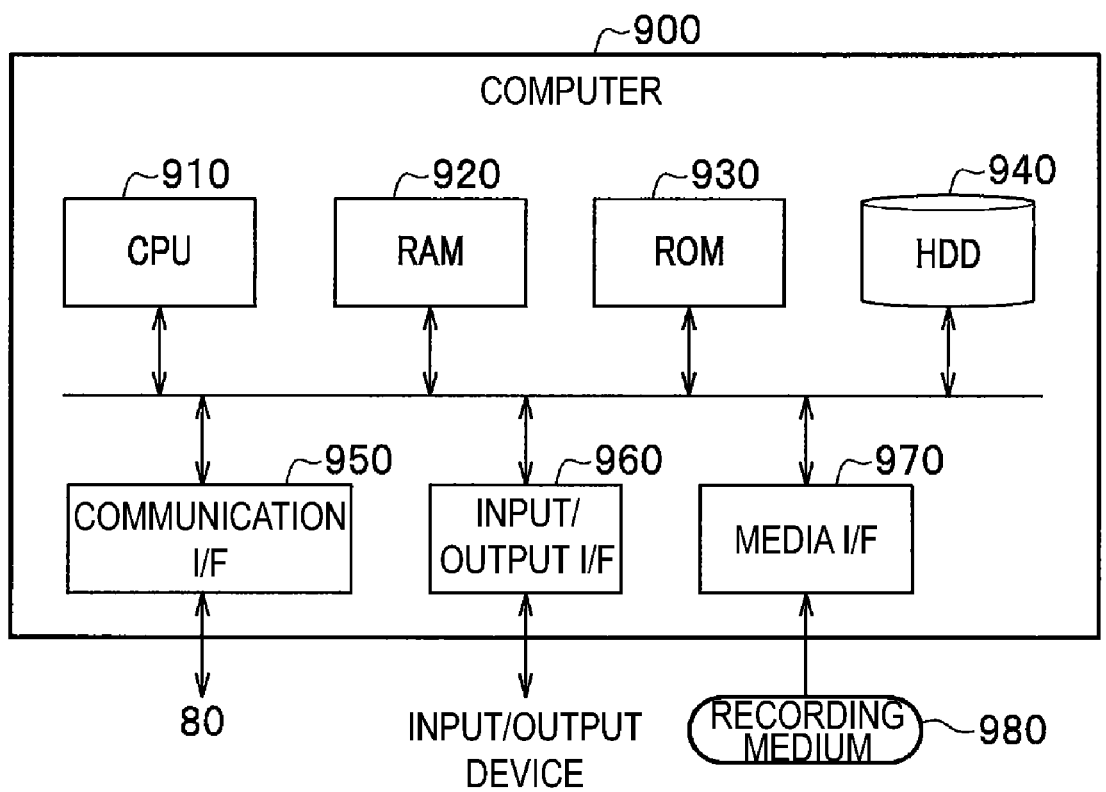
FIG. 10 is a hardware configuration diagram illustrating an example of a computer that achieves functions of the accelerator control system according to an embodiment of the present invention.
Figure 11:
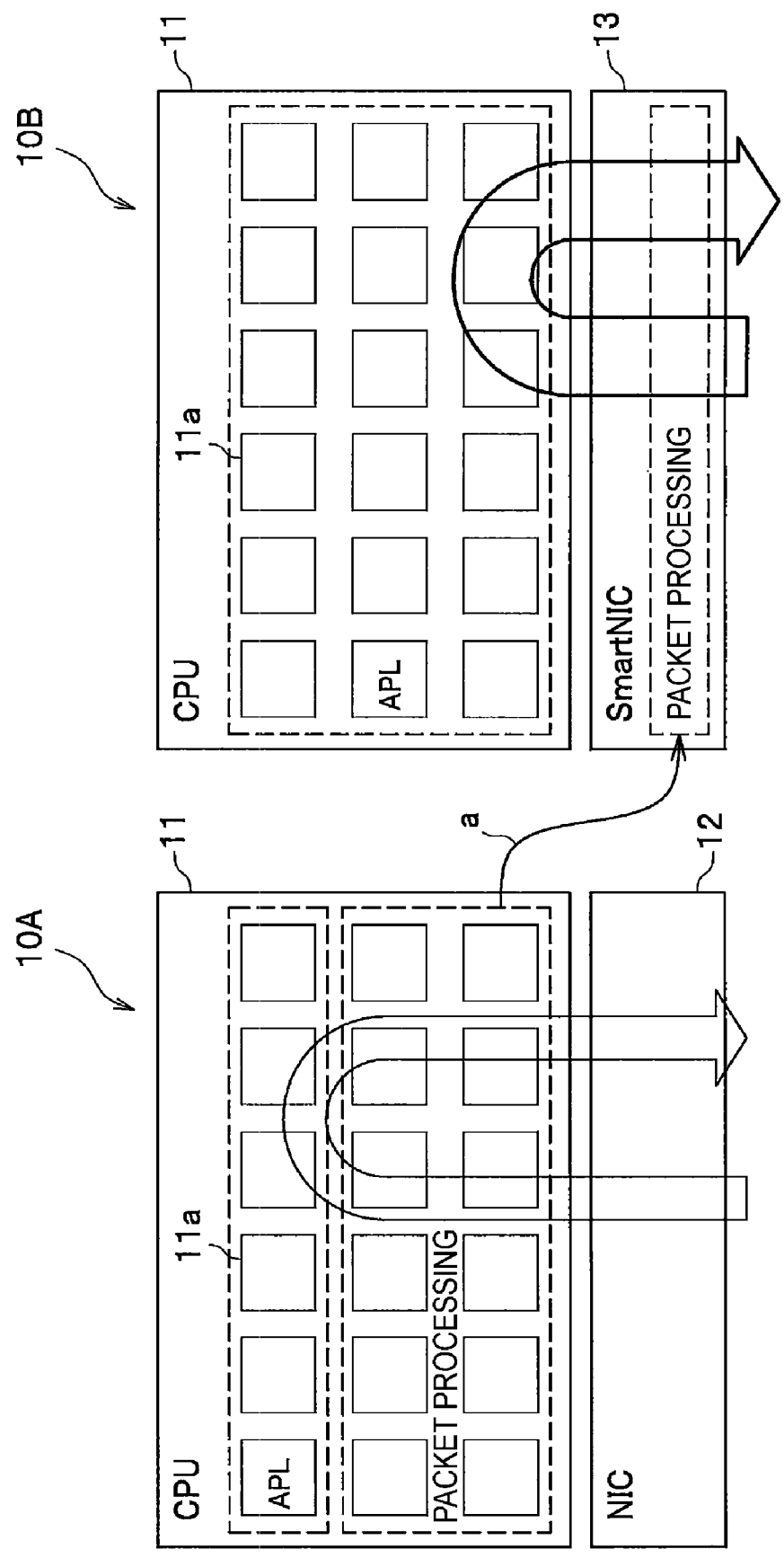
FIG. 11 is a schematic configuration diagram of an arithmetic system in which an arithmetic device specializing in specific processing is added to a general-purpose computer.
Figure 12:
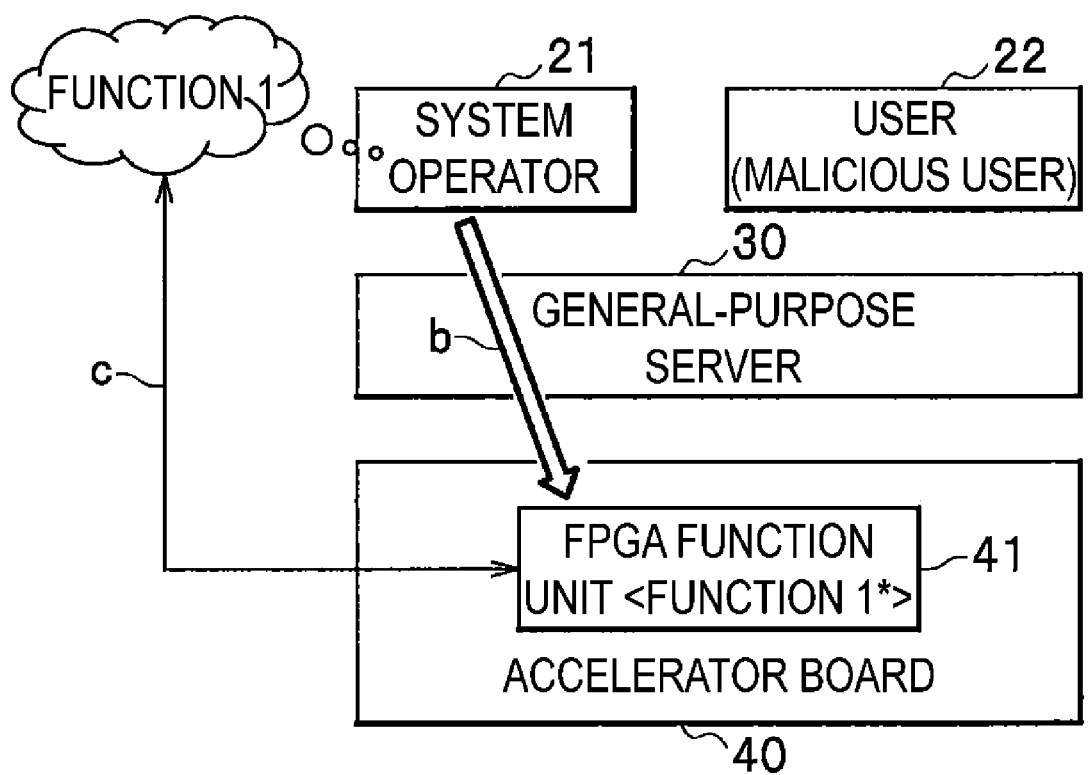
FIG. 12 is a diagram illustrating a function of offloading a function of software running on a general-purpose server to an accelerator board.
Figure 13:
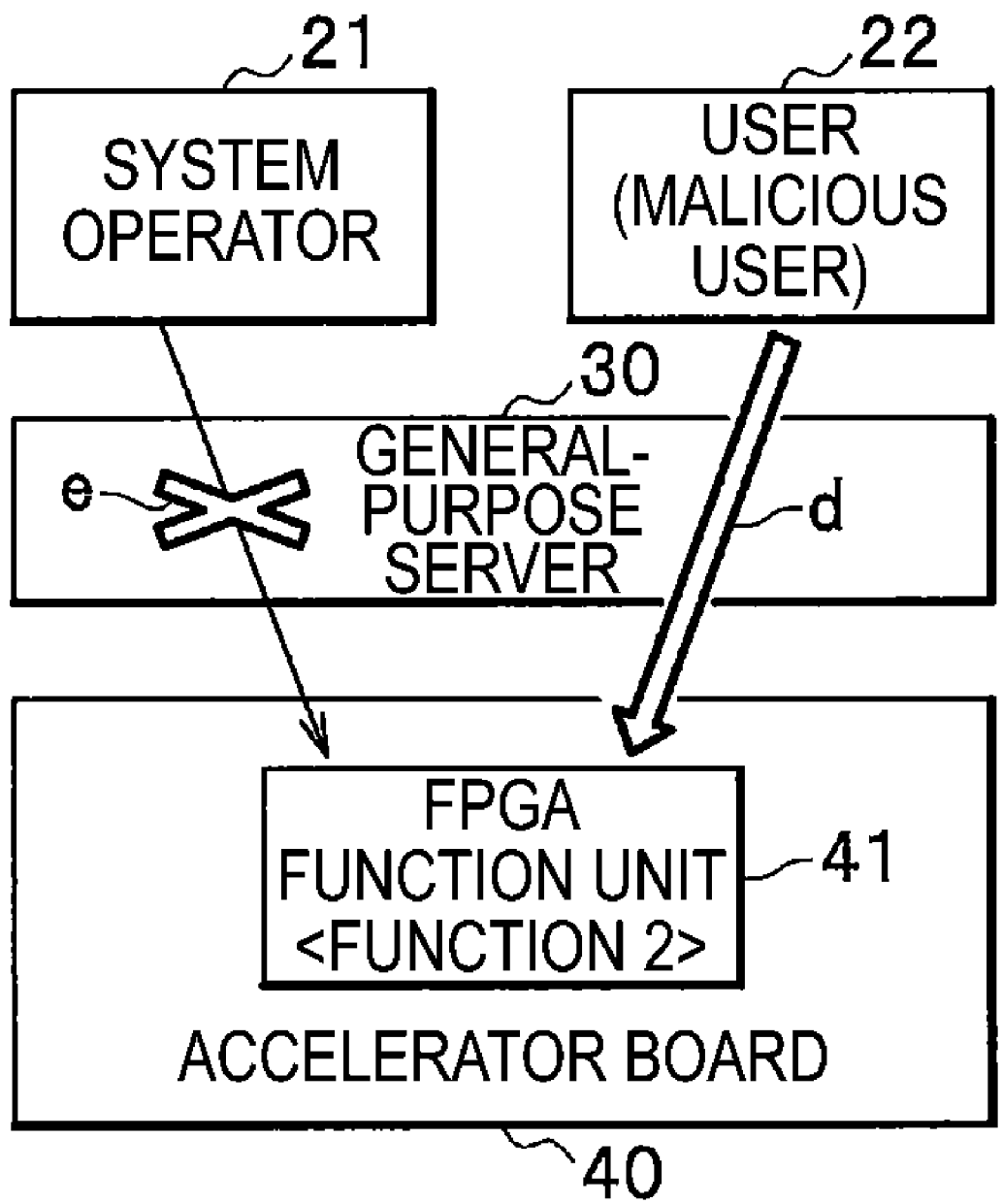
FIG. 13 is a diagram illustrating the function of offloading a function of software running on the general-purpose server to the accelerator board.

The general-purpose server 110 of the accelerator control system 100 according to the present embodiment is achieved, for example, by a computer 900 configured as illustrated in FIG. 10. Further, the accelerator board 120 of the accelerator control system 100 is achieved likewise, for example, by the computer 900 having configured as illustrated in FIG. 10.

Hereinafter, the general-purpose server 110 will be described as an example.

FIG. 10 is a hardware configuration diagram illustrating an example of the computer 900 achieving the functions of the general-purpose server 110.

The computer 900 includes a CPU 910, a RAM 920, a ROM 930 storing a basic input/output system (BIS), or the like, an HDD 940, a communication interface (I/F: Interface) 950, an input/output interface (I/F) 960, and a media interface (I/F) 970.

The CPU 910 operates in accordance with programs stored in the ROM 930 or the HDD 940 and performs control of each unit. The ROM 930 stores a boot program executed by the CPU 910 when the computer 900 is activated, a program dependent on the hardware of the computer 900, and the like.

The HDD 940 stores programs executed by the CPU 910, data used by the programs, and the like. The HDD 940 may store, for example, the digest DB 1113 and the binary file DB 140 (see FIG. 5). The communication interface 950 receives data from another apparatus via a communication network 80, sends the received data to the CPU 910, and transmits data generated by the CPU 910 to another apparatus via the communication network 80.

The CPU 910 controls, via the input/output interface 960, an output device such as a display and a printer, and an input device such as a keyboard and a mouse. The CPU 910 acquires data from the input device via the input/output interface 960. The CPU 910 also outputs the generated data to the output device via the input/output interface 960.

The media interface 970 reads a program or data stored in a recording medium 980 and provides the read program or data to the CPU 910 via the RAM 920. The CPU 910 loads such a program from the recording medium 980 onto the RAM 920 via the media interface 970 to execute the loaded program. The recording medium 980 is, for example, an optical recording medium such as a digital versatile disc (DVD) and a phase change rewritable disk (PD), a magneto-optical recording medium such as a magneto optical disk (MO), a tape medium, a magnetic recording medium, a semiconductor memory, or the like.

For example, when the computer 900 functions as the general-purpose server 110 according to the present embodiment, the CPU 910 of the computer 900 achieves the functions of the respective units of the general-purpose server 110 by executing the programs loaded on the RAM 920. In addition, the HDD 940 stores data of the inside of the respective units of the general-purpose server 110. Although the CPU 910 of the computer 900 reads these programs from the recording medium 980 and executes them, these programs may be acquired from another device via the communication network 80 as another example.

In addition, the accelerator board 120 may be installed in a different general-purpose server 110 or may be in the same general-purpose server 110. Here, encryption is helpful when the server management unit 111 and the FPGA management unit 121 illustrated in FIG. 1 are installed in different general-purpose servers. Although the accelerator board 120 is assumed to be basically built into the general-purpose server 110 in the present embodiment, the accelerator board 120 may operate in a stand-alone manner.

Advantages

As described above, in the accelerator control system 100 in which application-specific processing of the general-purpose server 110 is offloaded to the accelerator function unit (the FPGA function unit 122) of the accelerator board 120, the general-purpose server 110 includes an accelerator rewriting unit (the FPGA rewriting unit 112) that rewrites an accelerator function of the accelerator function unit, the digest information generation unit 1112 that binarizes the accelerator function to generate digest information 130 of the accelerator function, and a server management control unit 1111 that compares the digest information 130 created before the accelerator function is implemented on the accelerator function unit with digest information 130 notified from the accelerator board 120 and determines whether the accelerator function has been rewritten, and the accelerator board 120 includes the accelerator function unit (the FPGA function unit 122), the digest information generation unit 1212 that generates the digest information 130 of the accelerator function written in the accelerator function unit, and the accelerator management control unit (the FPGA management control unit 1211) that notifies the general-purpose server 110 serving as a rewriting source of the generated digest information 130.

With this configuration, rewriting of the accelerator function caused by an operation mistake made by a system operator or rewriting of the accelerator function by a malicious user can be prevented, and an unintended operation can be prevented in advance. In particular, there are an increasing number of cases in which a plurality of users uses an accelerator, such as a case in which a plurality of functions used by a plurality of users coexists on the same server by virtualization. In such a case, the accelerator control system 100 can achieve proper management of the functions implemented on the accelerator board, enabling the accelerator to be effectively utilized in a cloud environment in which a plurality of users is intermixed.

When the digest information 130 created before the accelerator function is implemented does not match the digest information 130 notified by the accelerator board 120, the server management control unit 1111 of the general-purpose server 110 of the accelerator control system 100 determines that the accelerator function has been rewritten and requests the accelerator management control unit (the FPGA management control unit 1211) to reimplement the accelerator function.

With this configuration, if it is determined that the accelerator function has been rewritten, the server management control unit 1111 of the server management unit 111 of the general-purpose server 110 requests the accelerator management control unit (the FPGA management control unit 1211) to reimplement the accelerator function, thereby preventing an unintended operation from being started.

When the digest information 130 created before the accelerator function is implemented on the accelerator function unit (the FPGA function unit 122) does not match the digest information 130 notified by the accelerator board 120, the server management control unit 1111 of the server management unit 111 of the general-purpose server 110 of the accelerator control system 100 may instruct the FPGA management control unit 1211 to stop the accelerator function unit until the accelerator function is normalized.

With this configuration, if it is determined that the accelerator function has been rewritten, the server management control unit 1111 of the server management unit 111 of the general-purpose server 110 can prevent an unintended operation from being performed until the accelerator function is normalized.

The accelerator board 120 of the accelerator control system 100 includes the private key management unit (the key management unit 1213) that manages a private key of the FPGA management control unit 1211 to be used for communication, the accelerator management control unit (the FPGA management control unit 1211) notifies the general-purpose server 110 of the generated digest information 130 by encrypting the generated digest information 130 with a private key that only the server management unit 111 knows, the general-purpose server 110 of the accelerator control system 100 includes the public key management unit (the key management unit 1114) that manages a public key of the server management control unit 1111 to be used for communication, and the public key management unit decrypts, with the public key, the digest information 130 encrypted and notified by the accelerator board 120.

With this configuration, rewriting of an accelerator function by a malicious user can be prevented even in an attack of the malicious user falsifying digest information to make it be believed that the acceleration function has not been rewritten.

Others

Among processing operations described for the principle and described in the embodiments, all or some of the processing operations described as being automatically performed can be manually performed, or all or some of the processing operations described as being manually performed can be automatically performed by using a well-known method. In addition, the processing procedures, the control procedures, the specific names, and information including various types of data, and various parameters described in the aforementioned document and diagrams can be modified as desired unless otherwise specified.

In addition, constituent components of the devices illustrated in the diagrams are functionally conceptual and are not necessarily physically configured as illustrated in the diagrams. That is, the specific aspects of distribution and integration of the devices are not limited to those illustrated in the diagrams, and all or some of the devices may be distributed or integrated functionally or physically in desired units depending on various kinds of loads, states of use, and the like.

In addition, some or all of the configurations, the functions, the processing units, the processing mechanisms, and the like may be achieved in hardware by being designed, for example, in an integrated circuit. In addition, each of the configurations, the functions, and the like described above may be achieved in software for a processor to interpret and execute a program that implements the functions. Information of programs, tables, files, and the like, which are for achieving the functions can be retained in a recording device such as a memory, a hard disk, and a solid-state drive (SSD), or a recording medium such as an integrated circuit (IC) card, a secure digital (SD) card, and an optical disc. In addition, in the present specification, processing steps for describing the time-series processing include not only processing performed in a time-series manner in described order not also parallel or individually performed processing (for example, parallel processing or object processing), rather than processing necessarily performed in a time-series manner.

REFERENCE SIGNS LIST

50 Accelerator file
100 Accelerator control system
110 General-purpose server
111 Server management unit
112 FPGA rewriting unit (accelerator rewriting unit)
120 Accelerator board
121 FPGA management unit (accelerator management unit)
122 FPGA function unit (accelerator function unit)
130 Digest information
130A Digest information created before accelerator function is implemented
130B Digest Information notified from accelerator board
140 Binary file DB
140A Binary file
1111 Server management control unit
1112 Digest information generation unit (server-side digest information generation unit)
1113 Digest DB
1114 Key management unit (public key management unit)
1115 FPGA communication unit
1211 FPGA management control unit
1212 Digest information generation unit (accelerator-side digest information generation unit)
1213 Key management unit (private key management unit)
1214 Server communication unit

The invention claimed is:

1. An accelerator control system configured to offload application-specific processing of a general-purpose server to an accelerator function unit on an accelerator board,
wherein the general-purpose server includes:
an accelerator rewriting unit, including one or more processors, configured to rewrite an accelerator function of the accelerator function unit;
a server-side digest information generation unit, including one or more processors, configured to binarize the accelerator function to generate first digest information of the accelerator function; and
a server management control unit, including one or more processors, configured to compare the first digest information created before the accelerator function is implemented on the accelerator function unit with second digest information notified from the accelerator board and determine whether the accelerator function is rewritten, and
the accelerator board includes:
the accelerator function unit including one or more processors;
an accelerator-side digest information generation unit, including one or more processors, configured to generate the second digest information of the accelerator function written in the accelerator function unit; and
an accelerator management control unit, including one or more processors, configured to notify the general-purpose server serving as a rewriting source of the second digest information generated.

2. The accelerator control system according to claim 1, wherein, when the first digest information created before the accelerator function is implemented does not match the second digest information notified from the accelerator board, the server management control unit is configured to determine that the accelerator function is rewritten and request the accelerator management control unit to reimplement the accelerator function.

3. The accelerator control system according to claim 1, wherein, when the first digest information created before the accelerator function is implemented on the accelerator function unit does not match the second digest information notified from the accelerator board, the server management control unit is configured to instruct the accelerator management control unit to stop the accelerator function unit until the accelerator function is normalized.

4. The accelerator control system according to claim 1, wherein the accelerator board includes a private key management unit, including one or more processors, configured to manage a private key of the accelerator management control unit to be used for communication, the accelerator management control unit is configured to encrypt, with the private key, the second digest information generated and then notify the general-purpose server of the second digest information encrypted, the general-purpose server includes a public key management unit, including one or more processors, configured to manage a public key of the server management control unit to be used for communication, and the server management control unit is configured to decrypt, with the public key, the second digest information encrypted and notified from the accelerator board.

5. An accelerator control method for offloading application-specific processing of a general-purpose server to an accelerator on an accelerator board, the accelerator control method comprising:

by the general-purpose server, rewriting an accelerator function of the accelerator;

by the general-purpose server, binarizing the accelerator function to generate first digest information of the accelerator function; and by the general-purpose server, comparing the first digest information created before the accelerator function is implemented on the accelerator with second digest information notified from the accelerator board and determining whether the accelerator function is rewritten, and by the accelerator board, generating the second digest information of the accelerator function written in the accelerator; and by the accelerator board, notifying the general-purpose server serving as a rewriting source of the second digest information generated.

6. The accelerator control method according to claim 5, further comprising:

when the first digest information created before the accelerator function is implemented does not match the second digest information notified from the accelerator board, by the general-purpose server, determining that the accelerator function is rewritten and requesting the accelerator board to reimplement the accelerator function.

7. The accelerator control method according to claim 5, further comprising:

when the first digest information created before the accelerator function is implemented on the accelerator function unit does not match the second digest information notified from the accelerator board, by the general-purpose server, instructing the accelerator board to stop the accelerator function unit until the accelerator function is normalized.

8. The accelerator control method according to claim 5, further comprising:

by the accelerator board, managing a private key of the accelerator board to be used for communication, by the accelerator board, encrypting, with the private key, the second digest information generated and then notifying the general-purpose server of the second digest information encrypted, by the general-purpose server, managing a public key of the general-purpose server to be used for communication, and by the general-purpose server, decrypting, with the public key, the second digest information encrypted and notified from the accelerator board.

\* \* \* \* \*